(12) United States Patent
Tucker

(10) Patent No.: US 6,794,880 B2
(45) Date of Patent: Sep. 21, 2004

(54) METHODS AND APPARATUS FOR DETECTING TERMINAL OPEN CIRCUITS AND SHORT CIRCUITS TO GROUND IN INDUCTIVE HEAD WRITE DRIVER CIRCUITS

(75) Inventor: Scott Tucker, Raleigh, NC (US)

(73) Assignee: Renesas Technology America, Inc., San Jose, CA (US)

( * ) Notice: Subject to any disclaimer, the term of this patent is extended or adjusted under 35 U.S.C. 154(b) by 11 days.

(21) Appl. No.: 10/075,437

(22) Filed: Feb. 14, 2002

(65) Prior Publication Data
US 2003/0151411 A1 Aug. 14, 2003

(51) Int. Cl.[7] .................. G01R 31/14; G01R 31/08; G11B 5/02
(52) U.S. Cl. .................. 324/511; 324/210; 324/523; 360/46; 360/75
(58) Field of Search .................. 324/510, 522, 324/523, 528, 537, 546, 547, 656, 212, 210, 511; 340/635; 360/46, 67, 68, 75; 327/53; 323/315; 29/593

(56) References Cited

U.S. PATENT DOCUMENTS

| | | | |
|---|---|---|---|
| 4,203,137 A | | 5/1980 | Beck et al. |
| 4,636,905 A | | 1/1987 | Morimoto et al. |
| 5,087,884 A | | 2/1992 | Brannon |
| 5,276,644 A | * | 1/1994 | Pascucci et al. ........ 365/189.01 |
| 5,304,935 A | * | 4/1994 | Rathke et al. .............. 324/415 |
| 5,434,717 A | * | 7/1995 | Yoshinaga et al. ............. 360/46 |
| 5,457,391 A | * | 10/1995 | Shimizu et al. .............. 324/546 |
| 5,592,097 A | * | 1/1997 | Shimizu et al. .............. 324/546 |
| 5,623,254 A | * | 4/1997 | Brambilla et al. ........... 340/644 |
| 5,712,739 A | * | 1/1998 | Nakamura et al. ............. 360/46 |
| 5,729,208 A | | 3/1998 | Ogiwara |
| 6,081,396 A | | 6/2000 | Ryat |
| 6,201,421 B1 | | 3/2001 | Takeuchi et al. |
| 6,340,885 B1 | * | 1/2002 | Hachisuka et al. .......... 324/210 |
| 6,710,594 B2 | * | 3/2004 | Eunkyu et al. .............. 324/210 |

\* cited by examiner

Primary Examiner—Anjan K. Deb
(74) Attorney, Agent, or Firm—Burns, Doane, Swecker & Mathis, L.L.P.

(57) ABSTRACT

Methods and apparatus to detect terminal open circuits and short circuits to ground in inductive head write drivers are presented. A exemplary method is provided for detecting a short-circuit condition at at least one of a pair of write head terminals of a write driver, the write driver producing a write current that, when passed through a inductive head assembly coupled to the pair of write head terminals, polarizes the inductive head according to a direction of the write current. The method includes the step of generating a first current that is proportional to at least a portion of the write current that flows in a first direction into a first write head terminal of the write driver. A second current is generated that is proportional to at least a portion of the write current that flows in a second direction, opposite the first direction, into a second write head terminal of the write driver. A short-circuit condition at at least one of the first and second write head terminals is detected when an average value of the first current is different from an average value of the second current by a predetermined amount.

23 Claims, 7 Drawing Sheets

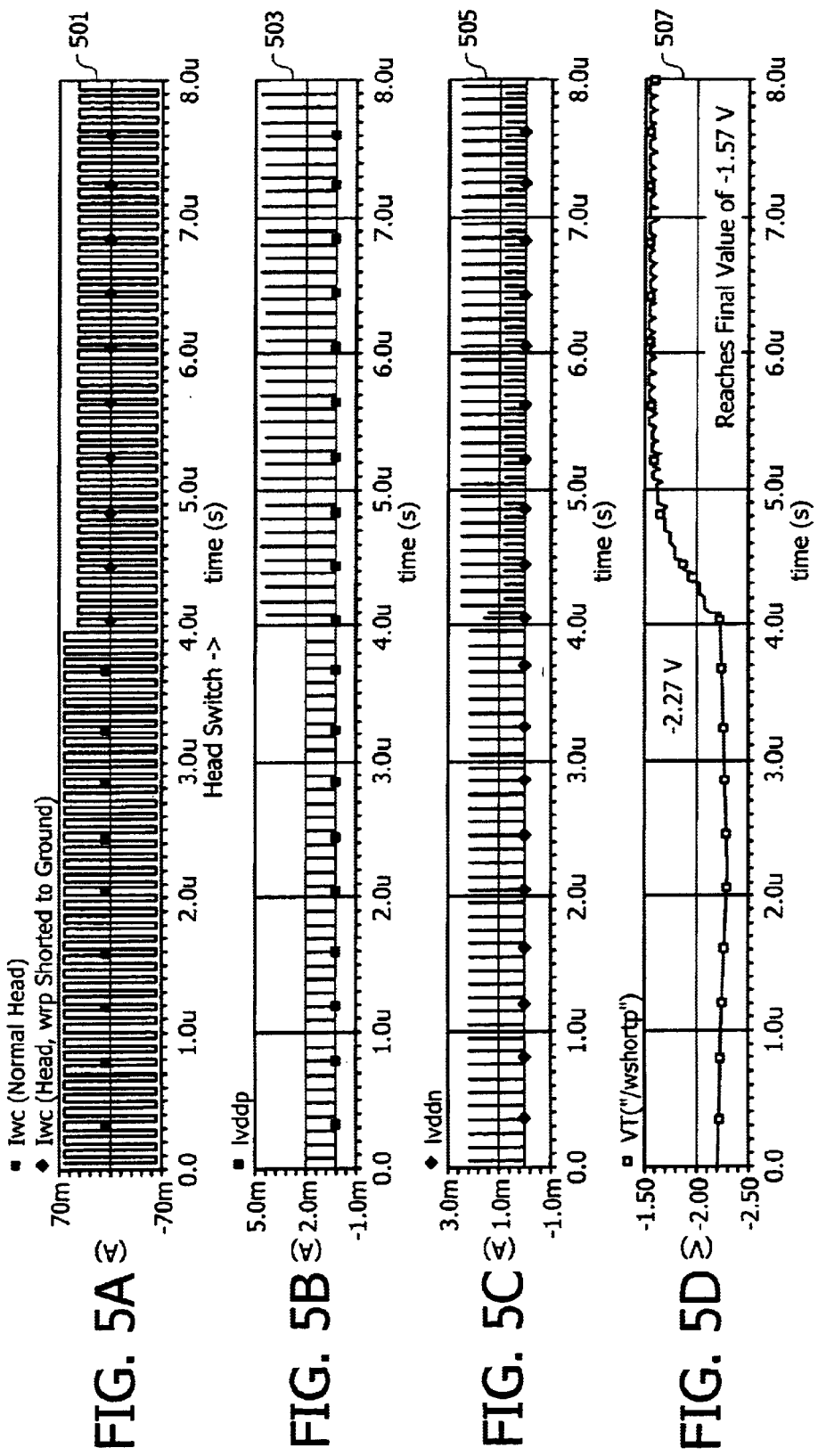

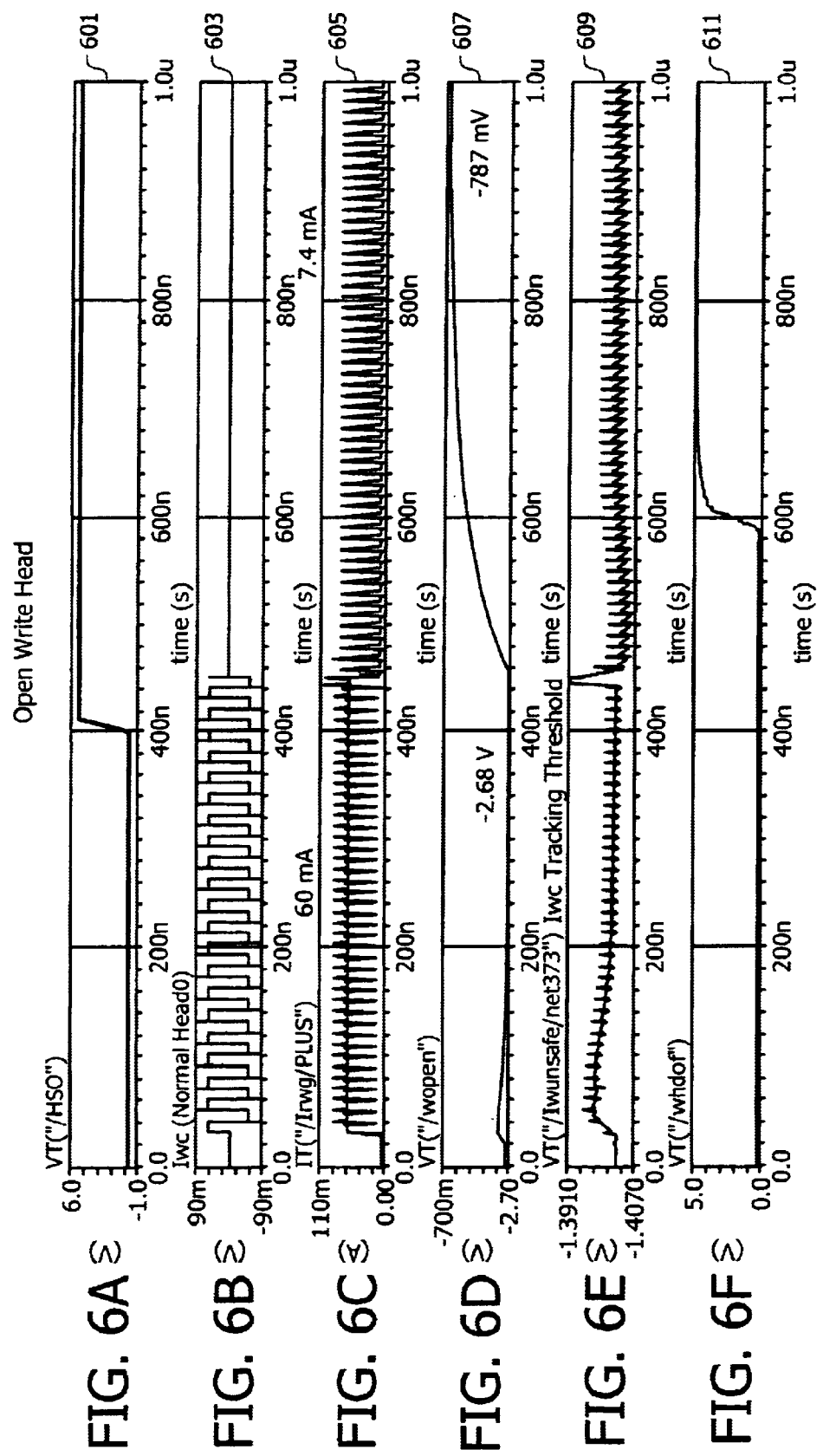

METHODS AND APPARATUS FOR DETECTING TERMINAL OPEN CIRCUITS AND SHORT CIRCUITS TO GROUND IN INDUCTIVE HEAD WRITE DRIVER CIRCUITS

BACKGROUND

The present invention is related to methods and apparatus for detecting terminal open circuits and short circuits to ground in inductive head write driver circuits. More particularly, the present invention is related to methods and apparatus for detecting terminal open circuits and short circuits to ground in inductive heads using voltage-mode write drivers.

Today's disk drives store data on magnetic rotating disks, or platters. These platters are typically made from glass or ceramic, and have a layer of magnetic material deposited on their surface. Data is stored in the form of binary digits transmitted to the disk drive in a corresponding time sequence of binary "one" and "zero"digits, or bits. These bits are converted into an electric current waveform that is delivered by wires to a write head. The write head is used to store the digital information on the magnetic platters.

A typical write head comprises a spiral inductive coil wrapped between two layers of soft magnetic material. At one end of the head, there exists a gap between the two magnetic layers, while at the other end of the head the magnetic layers are joined together. The layers of magnetic material are readily magnetized when an electric current flows in the inductive coil. This results in the layers becoming opposite magnetic poles of an extremely small electromagnet.

Data is typically stored on the platters by sending pulses of current from the drive electronics of the disk drive to the head assembly. The direction of the current, and thus the direction of the diverging magnetic field across the gap in the head, determines the magnetic polarization at any given location on the platter's magnetic coating. A timing clock may be synchronized to the turning of the platters, such that bit cells are formed corresponding to portions of the platter surface area. Some of these bit cells may be used store digital "ones", while others may be used to store "zeroes". Once written, the bits stored at the disk surface are "permanently" magnetized in either one direction or the other, until new data patterns are written over the previously stored patterns.

In a simple data storage scheme, a "one" bit may be encoded to correspond to a change in current polarity, while a "zero" bit may be encoded correspond to no change in polarity of the writing current. A moving disk may thus be magnetized in a positive direction for positive flowing current, and be magnetized in a negative direction for negative flowing current. This simple scheme results in the stored "ones" being represented by reversals in magnetic polarization on the surface of the disk, with the stored "zeroes" residing on the disk between the "one" values.

Two types of head malfunctions can cause information to not be written to the disk properly. One type of head malfunction is an open head condition. An open head condition occurs when the inductive coil breaks or does not make electrical contact with the head contacts. In other words, the inductive coil creates an open-circuit between the head contacts. The other type of head malfunction is a head short circuit condition. A head short circuit condition typically occurs when one of the head contacts becomes shorted to ground.

Disk drives typically include open and short-circuit head detection circuitry that can perform fault detection on the inductive head. During operation, if the inductive head malfunctions, this circuitry notifies the storage system of the malfunction by way of fault signals to prevent the disk drive system from attempting to write data through the defective head. An example of an open-circuit detection arrangement is described in U.S. Pat. No. 5,592,097 to Shimizu et al., entitled "Load Open State Detection Using H-Bridge Driving Circuit." An exemplary short-circuit detection arrangement is described in U.S. Pat. No. 5,434,717 to Yoshinaga et al., entitled "Read and/or Write Integrated Circuit Having an Operation Timing Adjusting Circuit and Constant Current Elements." Typically, this fault detection circuitry is included in the drive electronics of the disk drive.

The drive electronics include write driver circuitry (or write drivers) that deliver the needed write current to the inductive head to polarize the platter bit cells. Conventional write drivers operate as current-mode devices that deliver the write current to the head using programmable current mirrors. Conventional current-mode writer drivers, such as the write driver 100 (circuitry to the left of the dashed line) shown in FIG. 1, typically use an on-chip damping resistor 102 in parallel with the head assembly 104 to lower the output impedance of the write driver. The damping resistance 102 must be considerably larger than the impedance of the head assembly 104 to avoid shunting excessive DC write current $I_{WC}$. Another purpose of the damping resistor 102 is to provide a current path for $I_{WC}$ in the event that one of the head terminals 106 become open-circuited. When an head terminal open-circuit condition occurs, the increased voltage across the damping resistor 102 may be detected to notify the disk drive system of the open head fault.

Two methods may be used to detect a short-circuit to ground condition in the head terminals 106 of the current-mode write driver 100. In the first method, the average voltage across the head terminals 106 can be monitored (similar to the open-head detection method described above), and then a fault condition triggered when this average voltage exceeds some predetermined level. In the second method, the dramatic increase in $I_{WC}$ that occurs when one of the head terminals 106 is shorted to a power supply or ground can be detected, and used to signal the disk drive system of the short-circuit condition.

An exemplary short-circuit detection (SC detection) circuit 110 (circuitry to the right of the dashed line) for detecting this dramatic increase in $I_{WC}$ in a conventional current-mode write driver under short-circuit conditions is shown in FIG. 1. The SC detection circuit 110 comprises a bias resistor (R1), a low pass filter (R1,C1), an active current source (Q5, R3), a one-shot circuit (INV1, INV2, R5, C2), other bias circuitry (D3–D5, R4), and a D-latch.

Under normal operating conditions, the value of the bias resistor R1 is selected such that the voltage at node WS ($I_{WC}$*R1) establishes a current in transistor Q5 sufficient to turn on diodes D3–D5. Diodes D3–D5 establish a voltage at the data input of the D-latch that is just below the threshold level of the latch. The invertors INV1, INV2 establish a logic "0" at the clock input of the D-latch. Nominal current flows through R4 under normal conditions. The low-pass filter (R2,C1) filters transient noise spikes to prevent the SC detection circuit 110 from registering false short-circuit conditions. The value at the output $W_{hsgf}$ of the D-latch is a logic "0".

When a short-circuit occurs in one (or both) of the write head terminals 106, the magnitude of the short-circuit current $I_{WS}$ exceeds the normal write current $I_{WC}$ supplied by the constant current sources 108 by a significant amount. This added current, which flows through the bias resistor R1, will cause the voltage at the node WS to decrease, thus increasing the current flowing through transistor Q5. The added current flows through R4 and raises the voltage at the data input of the D-latch above the logic threshold level. This, in turn, causes the voltage to rise at the clock input of the D-latch to produce the one-shot signal. The rise time of the clock signal is controlled by the values of R5 and C2. When the voltage at the clock input rises above the logic threshold value, the output $W_{hsgf}$ of the D-latch switches to a logic "1", indicating a short-circuit condition has occurred.

To achieve higher disk drive data storage rates, it is important that the differential output impedance of the write driver match the impedance of the inductive coil assembly. The impedance of the inductive coil assembly is relatively low as compared to the high output impedance associated with current-mode write drivers. This impedance mismatch may cause undesirable undershoot and ringing in the write current transient response, which in turn may cause poor write driver performance and lower data storage rates.

A lower write driver output impedance that better matches the impedance of the inductive coil assembly may be achieved using voltage-mode write drivers. Voltage-mode write drivers establish an $I_{WC}$ in the inductive coil assembly of the inductive head using programmable peak voltage levels, instead of the programmable peak current levels established by current-mode writers. The added complexity of these voltage-mode write driver designs requires that new methods of detecting open and short circuit head terminal conditions be developed.

SUMMARY

Accordingly, the present invention addresses a need for providing methods and apparatus to detect terminal open circuits and short circuits to ground in inductive head write drivers.

According to one aspect, an arrangement is provided for detecting a short-circuit condition at at least one of a pair of write head terminals of a write driver, the write driver producing a write current that, when passed through a inductive head assembly coupled to the pair of write head terminals, polarizes the inductive head according to a direction of the write current. The arrangement includes a first current mirror that produces a first current that is proportional to at least a portion of the write current that flows in a first direction into a first write head terminal of the write driver. A second current mirror is included that produces a second current that is proportional to at least a portion of the write current that flows in a second direction, opposite the first direction, into a second write head terminal of the write driver. A short-circuit detection device responsive to the first and second currents is also included. The short-circuit detection device detects a short-circuit condition at at least one of the first and second write head terminals when an average value of the first current is different from an average value of the second current by a predetermined amount.

According to a related aspect, the first and second current mirrors each include two or more individual current mirrors which together mirror the respective at least portions of the write current two or more times in producing the respective first and second currents.

According to another related aspect, a first capacitor is included having a first terminal coupled to an output of the first current mirror and a first input terminal of the short-circuit detection device, the first capacitor having a second terminal coupled to an AC ground terminal. A second capacitor is included having a first terminal coupled to an output of the second current mirror and a second input terminal of the short-circuit detection device, the first capacitor having a second terminal coupled to an AC ground terminal. The first and second capacitors convert the respective first and second currents into corresponding first and second average voltages that are used by the short-circuit detection device to detect a difference in the average value of the first and second currents.

According to yet another related aspect, a first resistor is provided having a first terminal coupled to the output of the first current mirror, the first terminal of the first capacitor, and the first input terminal of the short-circuit detection device, the first resistor having a second terminal coupled to an AC ground terminal. A second resistor is also included having a first terminal coupled to the output of the second current mirror, the first terminal of the second capacitor, and the second input terminal of the short-circuit detection device, the second resistor having a second terminal coupled to an AC ground terminal. The first and second resistors, together with the first and second capacitors, filter out noise present in the respective first and second currents, and wherein the resistors provide respective bias values for the first and second average voltages used by the short-circuit detection device.

According to yet another related aspect, the short-circuit detection device is a differential comparator having an extended linear region that produces a short-to-ground fault signal at an output terminal of the comparator when the difference of the first and second average voltages presented at the input terminals of the comparator exceed the predetermined threshold.

According to yet another related aspect, the at least portions of the write current flowing into the write head terminals in the first and second directions correspond to respective boost currents that each comprise a portion of the overall write current flowing in a given direction for a part of a period needed to polarize the inductive head.

According to yet another related aspect, the magnitude of each of the boost currents is independent of the magnitude of a remaining portion of the overall write current flowing in a given direction for the period needed to polarize the inductive head.

According to another aspect, an arrangement is provided for detecting an open-circuit condition at at least one of a pair of write head terminals of a write driver, the write driver producing a write current that, when passed through a inductive head assembly coupled to the pair of write head terminals, polarizes the inductive head according to a direction of the write current. The arrangement includes a current mirror that produces a mirrored write current that is proportional to the write current that is passed through the inductive head assembly under normal operating conditions. An open-circuit detection device responsive to the mirrored write current is also included. The open-circuit detection device detects an open-circuit condition at at least one of the first and second write head terminals when the magnitude of the mirrored write current drops below a predetermined value.

According to a related aspect, a resistor is provided having a first terminal coupled to an output of the current mirror and a first input terminal of the open-circuit detection device, the first resistor having a second terminal coupled to a reference voltage. The resistor converts the mirrored write current into a voltage that is used by the open-circuit detection device to detect when the magnitude of the mirrored write current drops below the predetermined value.

According to yet another related aspect, the open-circuit detection device is a comparator having an extended linear region that produces an open-circuit fault signal at an output terminal of the comparator when voltage presented at the first input terminal of the comparator exceeds a reference voltage presented at a second input terminal of the comparator by a predetermined threshold.

According to yet another related aspect, the reference voltage presented at the second input terminal of the comparator is inversely proportional to the write current that is passed through the inductive head assembly under normal operating conditions.

According to another aspect, a voltage-mode write driver is provided, including circuitry to produce a write current that, when passed through a inductive head assembly coupled to the write driver through a pair of write head terminals, polarizes the inductive head according to a direction of the write current.

Circuitry is provided to detect a short-circuit condition at at least one of the write head terminals. This circuitry includes a first current mirror that produces a first current that is proportional to at least a portion of the write current that flows in a first direction into a first write head terminal of the write driver. The circuitry also includes a second current mirror that produces a second current that is proportional to at least a portion of the write current that flows in a second direction, opposite the first direction, into a second write head terminal of the write driver. Also a short-circuit detection device responsive to the first and second currents is provided.

Circuitry is also provided to detect an open-circuit condition at at least one of the write head terminals. This circuitry includes a third current mirror that produces a third current that is proportional to the write current that is passed through the inductive head assembly under normal operating conditions. An open-circuit detection device responsive to the third current is provided. The short-circuit detection device detects a short-circuit condition at at least one of the write head terminals when an average value of the first current is different from an average value of the second current by a first predetermined amount, and the open-circuit detection device detects an open-circuit condition at at least one of the write head terminals when the magnitude of the third current drops below a second predetermined value.

According to another aspect, a method is provided for detecting a short-circuit condition at at least one of a pair of write head terminals of a write driver, the write driver producing a write current that, when passed through a inductive head assembly coupled to the pair of write head terminals, polarizes the inductive head according to a direction of the write current. The method includes the step of generating a first current that is proportional to at least a portion of the write current that flows in a first direction into a first write head terminal of the write driver. A second current is generated that is proportional to at least a portion of the write current that flows in a second direction, opposite the first direction, into a second write head terminal of the write driver. A short-circuit condition at at least one of the first and second write head terminals is detected when an average value of the first current is different from an average value of the second current by a predetermined amount.

According to another aspect a method is provided for detecting an open-circuit condition at at least one of a pair of write head terminals of a write driver, the write driver producing a write current that, when passed through a inductive head assembly coupled to the pair of write head terminals, polarizes the inductive head according to a direction of the write current. The method includes the step of generating a mirrored write current that is proportional to the write current that is passed through the inductive head assembly under normal operating conditions. An open-circuit condition at at least one of the first and second write head terminals is detected when the magnitude of the mirrored write current drops below a predetermined value.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which:

FIG. 6 is a diagram illustrating operation of detection circuitry included in a voltage-mode write driver according to the present invention under open-circuit operating conditions.

DETAILED DESCRIPTION

Preferred embodiments of the present invention are described below with reference to the accompanying drawings. In the following description, well-known functions and/or constructions are not described in detail to avoid obscuring the invention in unnecessary detail.

Voltage-mode, as well as current-mode, write drivers typically employ a so-called H-bridge driver architecture. The center bar of the "H" represents the inductive write head, while the sides of the "H" represent the two alternate write current paths in the driver. In the H-bridge designs, current either flows along a first path from the upper right arm of the "H", through the write head, and then into the lower left leg, or along a second path from the upper left arm of the "H", through the write head, and then into the lower right leg. These two current flows product opposite magnetic fields in the write head. These opposite magnetic fields are used to produce opposite polarizations on the magnetic surface the drive platters to represent logical "one" and "zero" data values.

Figure 1:
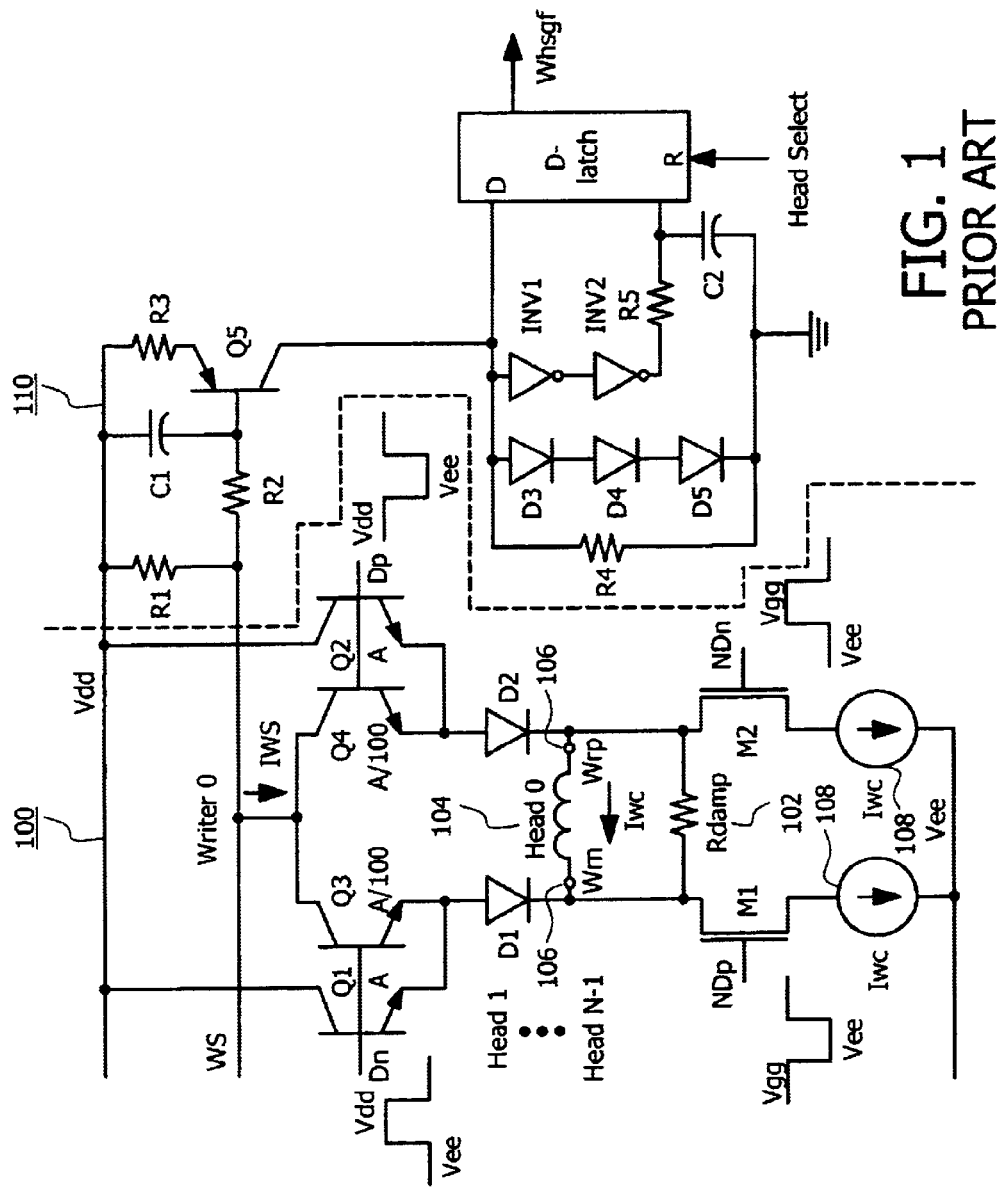
FIG. 1 is a schematic illustrating a conventional current-mode write driver.

What distinguishes a voltage-mode write driver from a current-mode driver is the manner in which the DC write current $I_{WC}$ is produced. In the current-mode write driver 100 of FIG. 1, two constant current sources 108 provide the write current $I_{WC}$. NPN input transistor devices Q1 and Q2, and NMOS input transistor devices M1 and M2 function primarily as switches. These switching transistors are driven by write control signals $D_P$, $D_N$, $ND_P$, and $ND_N$ that swing between the positive ($V_{DD}$, $V_{GG}$) and negative ($V_{EE}$) supply voltages of the driver circuit (see, e.g., FIG. 3). Driving the input transistors in this manner causes their operating points to switch from the full-on to the full-off state.

As a result, the output impedance of driver 100 (i.e., the impedance at terminals 106 with the write head 104 disconnected) is much higher than the relatively low impedance of the write head 106. A typical write head having a coil inductance of 20 nH, has an output impedance of about 12Ω. In contrast, the arrangement of FIG. 1 may have an output impedance greater than about 2KΩ. This impedance mismatch may cause ringing and overshoot to occur in the write current $I_{WC}$ transient response during a write operation. A parallel-connected damping resistor Rdamp may be used to lower the driver output impedance and thus attenuate the ringing and overshoot in the write current $I_{WC}$ transient response. But adding this damping resistor to the design will reduce the DC write current and may degrade the write current rise and fall times.

Figure 2:
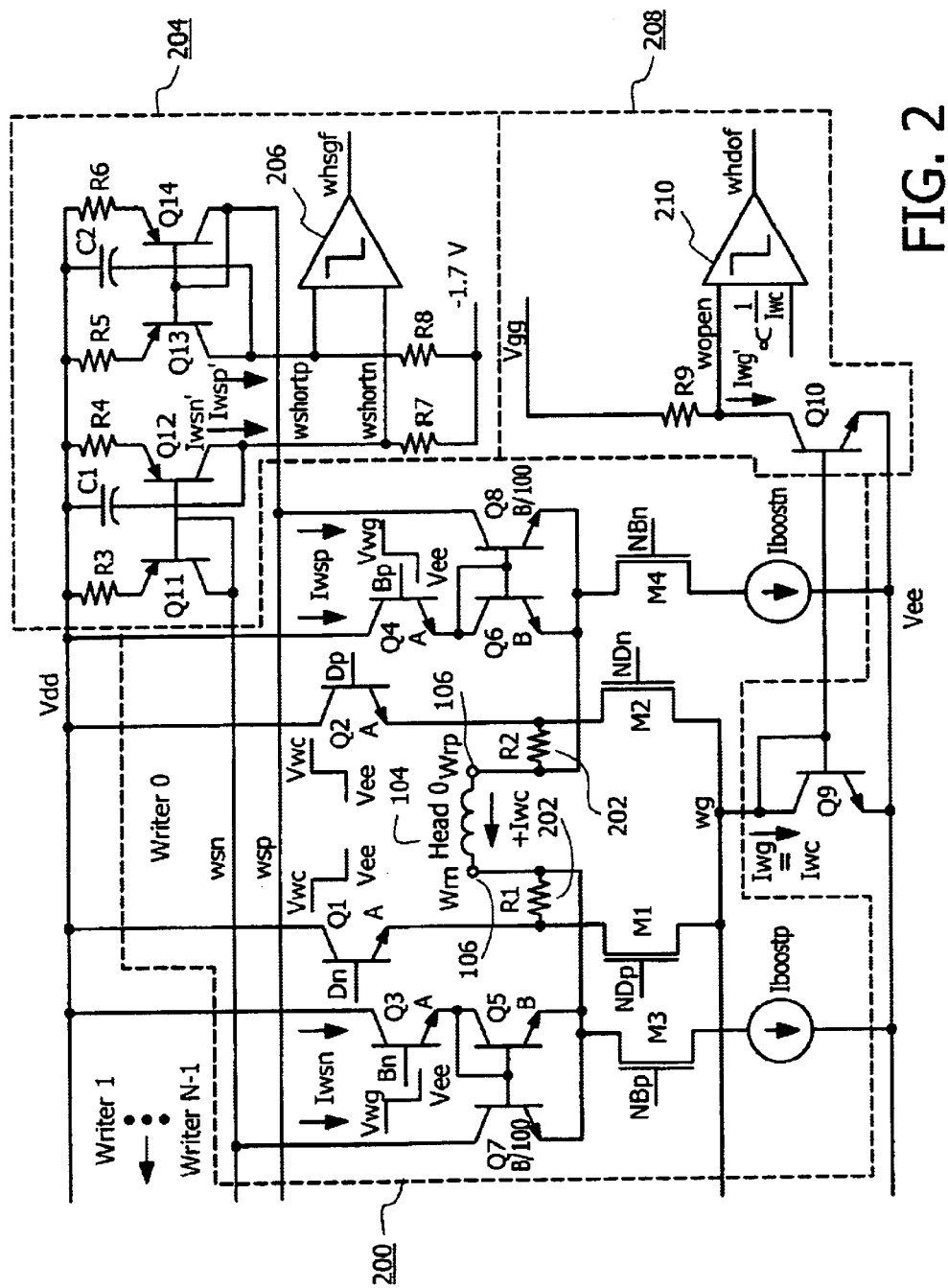
FIG. 2 is a schematic illustrating a voltage-mode write driver according to an embodiment of the present invention.

FIG. 2 shows a circuit diagram of an exemplary embodiment of a voltage-mode write driver according to the present invention. The voltage-mode write driver 200 uses both the peak write control voltage and the total resistance across the H-bridge structure to set the magnitude of the DC write current $I_{WC}$. Unlike the arrangement shown in FIG. 1, the NPN and NMOS input transistor devices Q1, Q2 and M1, M2 of FIG. 2 do not function merely as switches for steering the write current $I_{WC}$ through the H-bridge. This is because the control signals $D_P$, $D_N$, $ND_P$ and $ND_N$, unlike the corresponding control signals associated with the circuit of FIG. 1, do not fully swing between the positive and negative power supply values. Instead, these control signals $D_P$, $D_N$, $ND_P$, and $ND_N$ rise to an intermediate voltage value that is less than positive supply value. Driving the input transistors in this manner allows the transistors to switch between a full-off state and an active (or linear) on state during a write operation.

The write current $I_{WC}$ in FIG. 2 may be calculated according to the following equations:

$$I_{WCP}=(V_{D\,P}-V_{be\,Q2}-V_{be\,Q9})/(R_2+R_{HEAD\,0}+R_1+R_{on\,M1})$$

$$I_{WCN}=(V_{D\,N}-V_{be\,Q1}-V_{be\,Q9})/(R_1+R_{HEAD\,0}+R_2+R_{on\,M2}) \quad (1)$$

Establishing the write current $I_{WC}$ in this manner allows for an improved matching to be achieved between the write driver output impedance, present at the write head terminals 106, and the write head 104 impedance. The improved matching may be achieved by selecting appropriate values of $V_{DP}$ (and $V_{DN}$), $R_2$, and $R_1$ to match the driver output impedance to the impedance of the write head 104. This will reduce the ringing that may occur in the write current transient response during a write operation without the need for additional damping resistors. Accordingly, the voltage-mode writer shown in FIG. 2 generally has the ability to operate at higher data rates than does the current-mode writer of FIG. 1.

Figure 3:
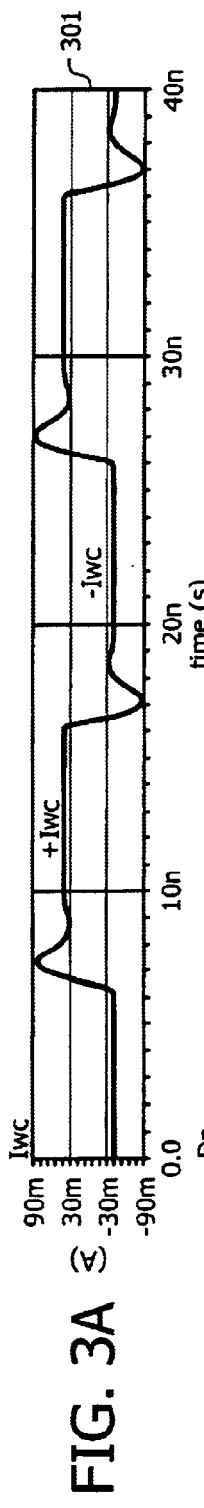
FIG. 3 is a diagram illustrating write current switching characteristics of a voltage-mode write driver according to the present invention.

FIG. 3 shows the switching characteristics of the voltage-mode write driver 200 shown in FIG. 2 under normal operating conditions. FIG. 3 shows write control signals $D_P$ and $D_N$ alternately switching between the write control voltage $V_{WC}$ and the negative supply voltage $V_{EE}$ in signal graphs 303 and 307, respectively. In addition, boost signals $B_P$ and $B_N$ are shown switching between the positive supply voltage $V_{DD}$ and write boost voltage $V_{WG}$ in signal graphs 305 and 309, respectively. The write boost signals $B_P$ and $B_N$ are active for short period at the beginning of each cycle of the respective write control signals $D_P$ and $D_N$. The resultant write current $I_{WC}$ is shown in signal graph 301. As can be seen in the graph 301, matching the write driver output impedance with the write head impedance allows the write current $I_{WC}$ to settle quickly.

Figure 4:
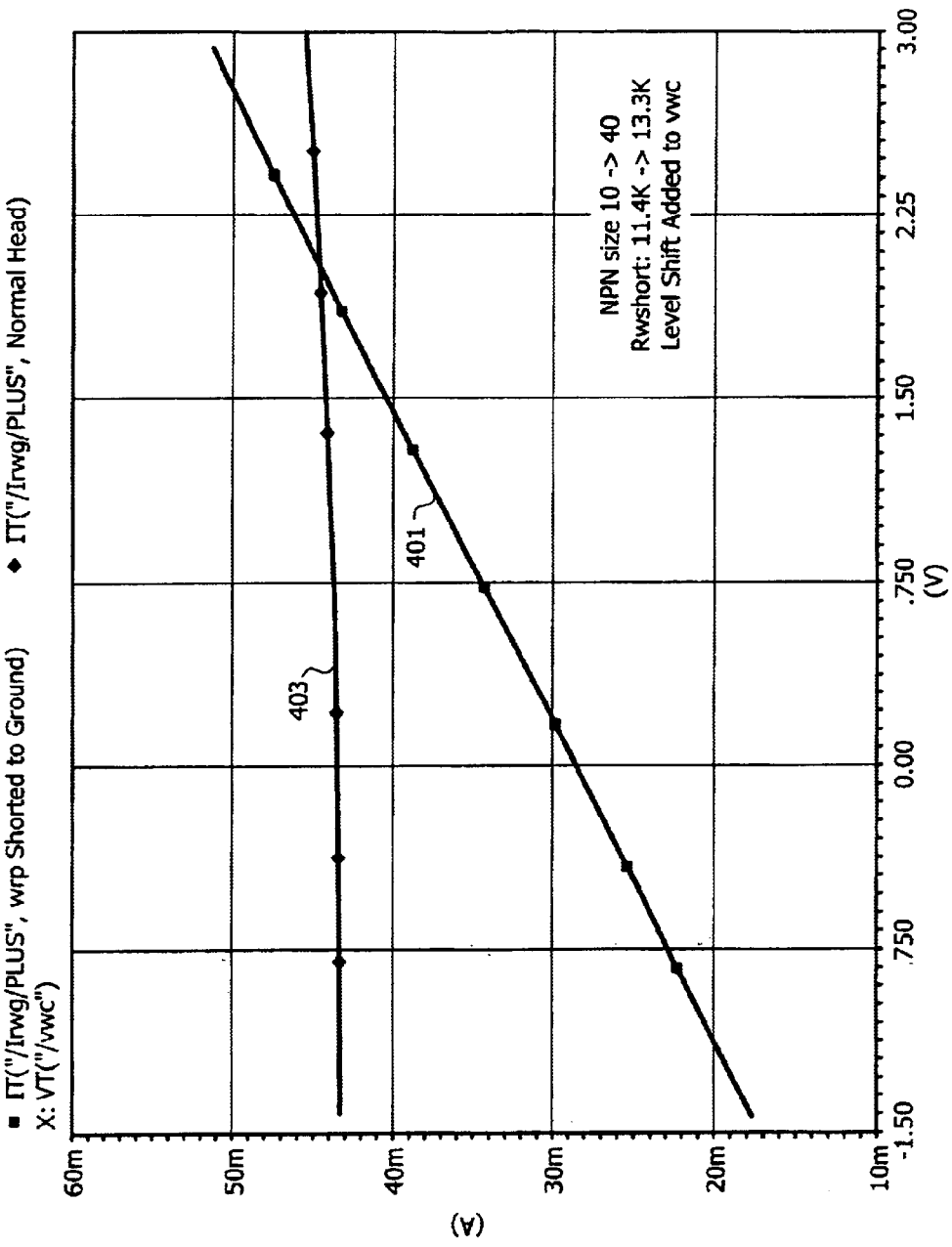
FIG. 4. is a diagram illustrating output characteristics of a voltage-mode write driver according to the present invention under normal and short-circuit operating conditions.

FIG. 4 shows the relationship between the write current $I_{WC}$ and the write control voltage $V_{WC}$ of the voltage-mode write driver circuit of FIG. 2 under normal and under write terminal short-to-ground conditions. Under normal conditions, the write current $I_{WC}$ varies linearly with the write control voltage $V_{WC}$ as shown by the curve 401. Both the positive ($I_{WCP}$) and negative ($I_{WCN}$) write currents vary symmetrically with $V_{WC}$ accordingly to the equations (1) under normal operating conditions. Referring to the driver circuit of FIG. 2, it will be understood that by choosing an appropriate value for the resistors R1 and R2, the resistors will degenerate the switching characteristics of transistors Q1 and Q2 causing the current to vary linearly across a wide range of the write control voltage $V_{WC}$.

When one of the write terminals 106 $W_{rn}$ or $W_{rp}$ is shorted to ground, however, the symmetrical relationship between the positive and negative write currents ($I_{WCP}$ and $I_{WCP}$) described by equations (1) no longer holds. Instead, the average value of the one of the positive or negative write currents will be greater than the other depending upon which write terminal 106 is shorted. Once such curve is shown as exemplary curve 403 of FIG. 4. This curve shows the variation of the write current $I_{WC}$ with the write voltage $V_{WC}$ with one of the write terminals ($W_{RP}$) shorted to ground. The non-symmetry between the positive and negative write currents occurs because the resistance that sets the magnitude of the two write currents will be different depending on the location of the short.

Referring again to the circuit of FIG. 2, it will be understood that shorting one of the write head terminals 106 to ground causes the transistor (Q1 or Q2) nearest the shorted terminal to turn on at lower values of $V_{WC}$. Likewise, the transistor (Q1 or Q2) farthest from the shorted terminal remains off for a greater amount of the excursion of $V_{WC}$. This, in turn, causes the switching characteristics of the write driver to be somewhat non-linear, as shown by the curve 403 of FIG. 4, in addition to having the non-symmetrical characteristics described above. Using the appropriate circuitry, these non-ideal switching characteristics may be used to detect short-circuit conditions in the voltage-mode write driver.

For example, one could monitor the positive and negative write currents ($I_{WCP}$ and $I_{WCN}$) to detect a difference in the average value of the write current. This difference could be used to indicate that one of the write head terminals 106 is shorted to ground. Rather than monitoring the write current $I_{WC}$ directly, it is preferred to monitor the boost currents $I_{WSN}$ and $I_{WSP}$. Like the write current, the average boost current passing through a shorted terminal will be larger than the average boost current passing through a non-shorted terminal. However, monitoring the boost current is preferable over monitoring the write current, as the boost current is independent of $V_{WC}$. Because the boost current is of short duration (see curves 305, 309 in FIG. 3), a method of integration that compensates for write data frequency must be employed.

In FIG. 2, circuitry for monitoring the boost currents to determine when a write terminal short-circuit condition exists is shown as block 204. It is preferred to monitor the boost currents differentially in order to remove any data dependent frequency effects from the measurements. The current mirrors formed by the transistor pairs Q5, Q7 and Q11, Q12 translate a copy of the boost current $I_{WSN}$ flowing through transistor Q3 into transistor Q12. Similarly, the current mirrors formed by transistor pairs Q6, Q8 and Q13, Q14 translate a copy of the boost current $I_{WSP}$ flowing through transistor Q4 into transistor Q13.

It is preferable that these current mirrors be designed to be well matched to one another, such that the mirrors comparably track environmental and process changes. The absolute accuracy of the individual current mirror is not critical, however, and may vary by upwards of 20% or more. Because the boost currents are preferably monitored differentially, any absolute errors in the current mirrors will cancel out in the comparison.

It will be understood by those skilled in the art that the current mirrors formed by the transistor pairs Q11, Q12 and Q13, Q14 may be omitted from the design. Instead, the currents produced the current mirrors formed by the transistor pairs Q5, Q7 and Q6, Q8 may be monitored directly to detect a write head terminal short-circuit condition. However, it is preferred to include the additional current mirrors in the design and monitor the currents produced by these additional current mirrors, in order to provide more suitable signal levels to the detection circuitry and to better isolate the detection circuitry from fluctuations in the power supply.

The mirror transistors Q12, Q13 have integrating capacitors C1, C2 tied to their respective collector terminals at nodes wshortn and wshortp, respectively. The mirrored boost current pulses $I_{WSN}{'}$ and $I_{WSP}{'}$ are converted into a DC voltage by the integrating capacitors C1, C2. Terminating resistors R7 and R8 each have one terminal tied to the nodes wshortn and wshortp, and operate in conjunction with the capacitors C1, C2 to filter out noise in the boost current pulses $I_{WSN}{'}$ and $I_{WSP}{'}$.

The nodes wshortn and wshortp form the inputs of the short circuit detection device 206. This device is preferably a differential comparator with an extended linear region. The comparator 206 operates such that no fault is triggered as long as the voltage at the node wshortn is comparable with the voltage at the node wshortp. If, however, the voltage at one of the nodes rises above the other by an amount greater than a triggering threshold of the comparator 206, a write head short-to-ground fault will be posted at the comparator output terminal node whsgf. Using a comparator with an extended linear region is preferred such that data glitches at low frequency will not accidentally trigger a false short-to-ground fault.

Figure 5E:
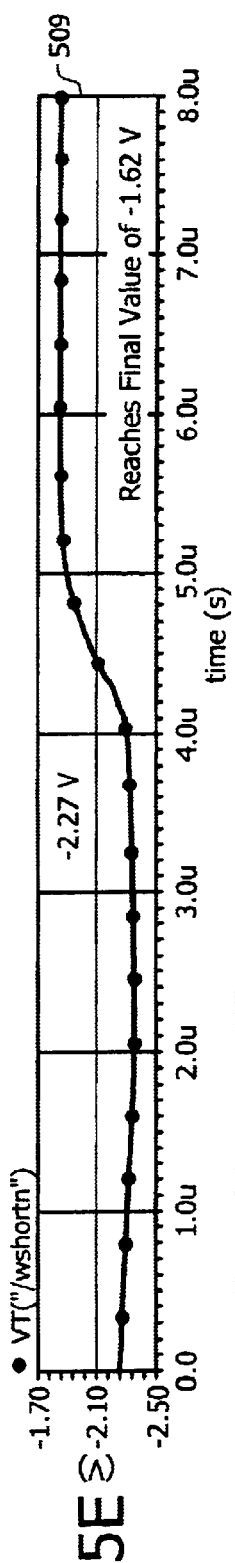
FIG. 5 is a diagram illustrating operation of detection circuitry included in a voltage-mode write driver according to the present invention under short-circuit operating conditions.
Figure 5F:
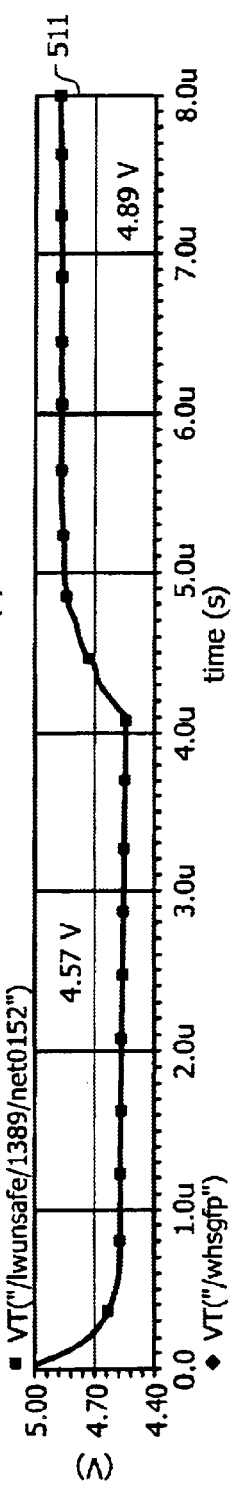
Figure 5G:
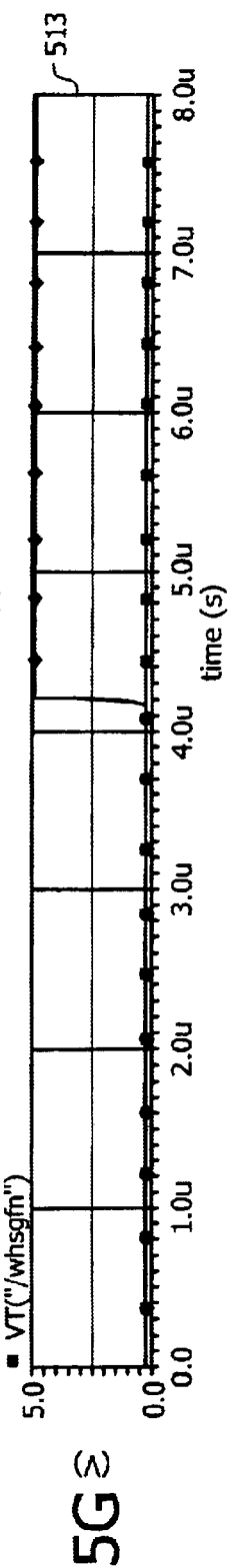

FIG. 5 shows operation of the write driver circuit of FIG. 2 and its short-circuit detection circuitry under both normal and write head terminal short-to-ground conditions. The short-circuit head condition is triggered about halfway through the analysis at about four microseconds. Curve 501 shows the write current $I_{WC}$ being alternately switched through the H-bridge of the write driver circuit 200. Before the short-circuit condition occurs, the positive and negative excursions of the write current pulses are symmetrical. When the short occurs, however, the pulse excursions become unsymmetrical, with the negative pulses being somewhat greater in amplitude than the positive pulse. The average values of the positive and negative boost currents become skewed as a result of the short circuit condition. This is illustrated by the skewed positive and negative boost currents $I_{VDDP}$ and $I_{VDDN}$ shown by the curves 503 and 505, respectively.

The voltages at the comparator 206 input nodes wshortp and wshortn are shown respectively in curves 507 and 509 of FIG. 5. Prior to the short-circuit condition occurring, the voltages at these nodes have substantially the same DC value. This occurs because the mirror currents $I_{WSP}{'}$ and $I_{WSN}{'}$ being integrated by capacitors C1, C2 are nearly the same. Accordingly, the output of the comparator 206 prior to the short-circuit condition occurring is low as shown in the curve 513, indicating that the write driver circuit 200 is operating properly.

When the short-circuit condition occurs at around four microseconds into the analysis, however, the DC values of the voltages at the nodes wshortp and wshortn begin to drift apart. Eventually, these nodes reach the final values of, e.g., −1.57 and −1.82 volts, respectively. However, when the difference in the respective values of the nodes exceeds the threshold of the comparator 206, the output of the comparator 206 changes state to indicate that a short-circuit condition has been detected. This is shown to occur in the analysis shortly after the short-circuit condition occurs at about 4.3 microseconds by the switching of the comparator output shown in curve 513.

In addition to detecting short-circuit conditions, there is a need to detect open-circuit head conditions in voltage-mode write driver circuits. An example of such circuitry may be found in the block 208 of FIG. 2. The block 208 comprises mirror transistors Q9, Q10 that translate a copy of the write current $I_{WG}$ (that is approximately equal to $I_{WC}$ under normal operating conditions) flowing through transistor Q9 into transistor Q10. Recall that, unlike the current-mode write driver of FIG. 1, the voltage-mode write driver 200 does not require a damping resistor (such as Rdamp of FIG. 1). Thus, when an open-circuit head condition occurs, there exists no shunt path for the write current to travel in the circuit. Accordingly, when an open-circuit head condition occurs in the voltage-mode write driver of FIG. 2, the write current $I_{WG}$ will approach zero. This characteristic may be used to detect the open-circuit head condition when it occurs.

Referring again to block 208 of FIG. 2, as the write current $I_{WG}$ approaches zero, the mirror current $I_{WG}{'}$ in the transistor Q10 will also decrease. A pull-up resistor R9 has one terminal tied to the collector of transistor Q10 forming the node wopen. The other terminal of the resistor R9 is tied to a power supply $V_{GG}$. As the current $I_{WG}{'}$ decreases, the pull-up resistor R9 will cause the voltage at will the node wopen to rise.

An open-circuit detection device 210 has one of its inputs tied the node wopen. This device is preferably a comparator having its second input tied to a reference voltage that is inversely proportional to the write current $I_{WC}$ flowing through the H-bridge under normal operating conditions. In this way, as the write current is increased $I_{WC}$ (perhaps to account for environmental or process changes) in the write driver circuit, the reference voltage will decrease to account for the added voltage drop across the pull-up resistor R9. Having a reference voltage that is inversely proportional to $I_{WC}$ ensures that the comparator input voltage will be relatively constant over the programmable range of the write driver current. As the voltage at the node wopen rises above the reference voltage by some predetermined threshold of the comparator 210, an open-circuit signal will be produced at the output terminal whdof.

FIG. 6 shows operation of the write driver circuit of FIG. 2 and its open-circuit head detection circuitry under both normal and write head open-circuit conditions. An open head is selected at about 400 nanoseconds into the analysis, as shown by curve 601. Curve 603 shows that prior to the open-circuit condition occurring, the write current $I_{WC}$ is again symmetrically switching between its positive and negative limits. Curve 605 shows that the write current $I_{WG}$, which represents the magnitude sum of the positive and negative write currents, is constant up to the point that the open head is selected.

After the open-circuit condition occurs at 400 nanoseconds into the analysis, both the write currents $I_{WC}$ and $I_{WG}$ approach zero amps. The node voltage wopen, shown in curve 607, had been stable around −2.7 volts before the open-circuit condition occurred. However, after the open-circuit occurs and the write current $I_{WG}$ starts to approach zero, the voltage at the node wopen begins to rise. This voltage is compared by the comparator 210 with a reference voltage that is inversely proportional to the write current $I_{WC}$. This $I_{WC}$ reference threshold voltage is shown in curve 609 of FIG. 6. Prior to the open-circuit occurring, the voltage at the node wopen was less than the $I_{WC}$ reference voltage, and thus the output at the comparator 210, as shown in curve 611, is low. As the voltage at the node wopen rises above the $I_{WC}$ reference voltage at around 600 nanoseconds, the comparator detects the open-circuit head conditions, and the output voltage of the comparator 210 changes to a high state to indicate the fault.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. An arrangement for detecting a short-circuit condition at at least one of a pair of write head terminals of a write driver, the write driver producing a write current that, when passed through a inductive head assembly coupled to the pair of write head terminals, polarizes the inductive head according to a direction of the write current, the arrangement comprising:

a first current mirror that produces a first current that is proportional to at least a portion of the write current that flows in a first direction into a first write head terminal of the write driver;

a second current mirror that produces a second current that is proportional to at least a portion of the write current that flows in a second direction, opposite the first direction, into a second write head terminal of the write driver; and a short-circuit detection device responsive to the first and second currents;

wherein the short-circuit detection device detects a short-circuit condition at at least one of the first and second write head terminals when an average value of the first current is different from an average value of the second current by a predetermined amount.

2. The arrangement according to claim 1, wherein the first and second current mirrors each comprise two or more individual current mirrors which together mirror the respective at least portions of the write current two or more times in producing the respective first and second currents.

3. The arrangement according to claim 1, further comprising:

a first capacitor having a first terminal coupled to an output of the first current mirror end a first input terminal of the short-circuit detection device, the first capacitor having a second terminal coupled to an AC ground terminal; and a second capacitor having a first terminal coupled to an output of the second current mirror and a second input terminal of the short-circuit detection device, the first capacitor having a second terminal coupled to an AC ground terminal;

wherein the first and second capacitors convert the respective first and second currents into corresponding first and second average voltages that are used by the short-circuit detection device to detect a difference in the average value of the first and second currents.

4. The arrangement of claim 3, further comprising:

a first resistor having a first terminal coupled to the output of the first current mirror, the first terminal of the first capacitor, and the first input terminal of the short-circuit detection device, the first resistor having a second terminal coupled to an AC ground terminal; and a second resistor having a first terminal coupled to the output of the second current mirror, the first terminal of the second capacitor, and the second input terminal of the short-circuit detection device, the second resistor having a second terminal coupled to an AC ground terminal;

wherein the first and second resistors, together with the first and second capacitors, fitter out noise present in the respective first and second currents, and wherein the resistors provide respective bias values for the first and second average voltages used by the short-circuit detection device.

5. The arrangement of claim 3, wherein the shout-circuit detection device is a differential comparator having an extended linear region that produces a short-to-ground fault signal at an output terminal of the comparator when the difference of the first and second average voltages presented at the input terminals of the comparator exceed the predetermined threshold.

6. The arrangement of claim 1, wherein the at least portions of the write current flowing into the write head terminals in the first and second directions correspond to respective boost currents that each comprise a portion of the overall write current flowing in a given direction for a part of a period needed to polarize the inductive head.

7. The arrangement of claim 6, wherein the magnitude of each of the boost currents is independent of the magnitude of a remaining portion of the overall write current flowing in a given direction for the period needed to polarize the inductive head.

8. An arrangement for detecting an open-circuit condition at at least one of a pair of write head terminals of a write driver, the write driver producing a write current that, when passed in at least one of two directions through an inductive head assembly coupled to the pair of write head terminals, polarizes the inductive head according to the at least one direction of the write current, the arrangement comprising:

a current mirror that produces a mirrored write current that is proportional to the write current that is passed through the inductive head assembly in the two directions; and an open-circuit detection device responsive to the mirrored write current;

wherein the open-circuit detection device detects an open-circuit condition at at least one of the first and second write head terminals when the magnitude of the write current drops below a predetermined value.

9. The arrangement of claim 8, further comprising:

a resistor having a first terminal coupled to an output of the current mirror and a first input terminal of the open-circuit detection device, the first resistor having a second terminal coupled to a reference voltage;

wherein the resistor converts the mirrored write current into a voltage that is used by the open-circuit detection device to detect when the magnitude of the write current drops below the predetermined value.

10. The arrangement of claim 9, wherein the open-circuit detection device is a comparator having an extended linear region that produces an open-circuit fault signal at an output terminal of the comparator when voltage presented at the first input terminal of the comparator exceeds a reference voltage presented at a second input terminal of the comparator by a predetermined threshold.

11. The arrangement of claim 10, wherein the reference voltage presented at the second input terminal of the comparator is inversely proportional to the write current that is passed through the inductive head assembly under normal operating conditions.

12. A voltage-mode write driver, comprising:
   circuitry to produce a write current that, when passed through a inductive head assembly coupled to the write driver through a pair of write head terminals, polarizes the inductive head according to a direction of the write current;
   circuitry to detect a short-circuit condition at at least one of the write head terminals, including
      a first current mirror that produces a first current that is proportional to at least a portion of the write current that flows in a first direction into a first write head terminal of the write driver;
      a second current mirror that produces a second current that is proportional to at least a portion of the write current that flows in a second direction, opposite the first direction, into a second write head terminal of the write driver; and
      a short-circuit detection device responsive to the first and second currents; and
   circuitry to detect an open-circuit condition at at least one of the write head terminals, including
      a third current mirror that produces a third current that is proportional to the write current that is passed through the inductive head assembly in the first and second directions; and
      an open-circuit detection device responsive to the third current;
   wherein the short-circuit detection device detects a short-circuit condition at at least one of the write head terminals when an average value of the first current is different from an average value, of the second current by a first predetermined amount, and the open-circuit detection device detects an open-circuit condition at at least one of the write head terminals when the magnitude of the write current drops below a second predetermined value.

13. The voltage-mode write driver according to claim 12, wherein the first and second current mirrors each comprise two or more individual current mirrors which together mirror the respective at least portions of the write current two or more times in producing the respective first and second currents.

14. The voltage-mode write driver according to claim 12, wherein the circuitry to detect a short-circuit condition further includes:
   a first capacitor having a first terminal coupled to an output of the first current mirror and a first input terminal of the short-circuit detection device, the first capacitor having a second terminal coupled to an AC ground terminal; and
   a second capacitor having a first terminal coupled to an output of the second current mirror and a second input terminal of the short-circuit detection device, the first capacitor having a second terminal coupled to an AC ground terminal;
   wherein the first and second capacitors convert the respective first and second currents into corresponding first and second average voltages that are used by the short-circuit detection device to detect a difference in the average value of the first and second currents.

15. The voltage-mode write driver according to claim 14, wherein the circuitry to detect a short-circuit condition further includes:
   a first resistor having a first terminal coupled to the output of the first current mirror, the first terminal of the first capacitor, and the first input terminal of the short-circuit detection device, the first resistor having a second terminal coupled to an AC ground terminal; and
   a second resistor having a first terminal coupled to the output of the second current mirror, the first terminal of the second capacitor, and the second input terminal of the short-circuit detection device, the second resistor having a second terminal coupled to an AC ground terminal;
   wherein the first and second resistors, together with the first and second capacitors, filter out noise present in the respective first and second currents, and wherein the resistors provide respective bias values for the first and second average voltages used by the short-circuit detection device.

16. The voltage-mode write driver of claim 14, wherein the short-circuit detection device is a differential comparator having an extended linear region that produces a short-to-ground fault signal at an output terminal of the comparator when the difference of the first and second average voltages presented at the input terminals of the comparator exceed the first predetermined threshold.

17. The voltage-mode write driver of claim 12, wherein the at least portions of the write current flowing into the write head terminals in the first and second directions correspond to respective boost currents that each comprise a portion of the overall write current flowing in a given direction for a part of a period needed to polarize the inductive head.

18. The voltage-mode write driver of claim 17, wherein the magnitude of each of the boost currents is independent of the magnitude of a remaining portion of the overall write current flowing in a given direction for the period needed to polarize the inductive head.

19. The voltage-mode write driver of claim 12, wherein the circuitry to detect an open-circuit condition further includes:
   a resistor having a first terminal coupled t[] an output of the third current mirror and a first input terminal of the open-circuit detection device, the first resistor having a second terminal coupled to a reference voltage;
   wherein the resistor converts the third current into a voltage that is used by the open-circuit detection device to detect when the magnitude of the write current drops below the second predetermined value.

20. The arrangement of claim 19, wherein the open-circuit detection device is a comparator having an extended linear region that produces an open-circuit fault signal at an output terminal of the comparator when voltage presented at the first input terminal of the comparator exceeds a reference voltage presented at a second input terminal of the comparator by a predetermined threshold.

21. The arrangement of claim 20, wherein the reference voltage presented at the second input terminal of the comparator is inversely proportional to the write current that is passed through the inductive head assembly under normal operating conditions.

22. A method for detecting a short-circuit condition at at least one of a pair of write head terminals of a write driver, the write driver producing a write current that, when passed through a inductive head assembly coupled to the pair of write head terminals, polarizes the inductive head according to a direction of the write current, the method comprising the steps of:

generating a first current that is proportional to at least a portion of the write current that flows in a first direction into a first write head terminal of the write driver;

generating a second current that is proportional to at least a portion of the write current that flows in a second direction, opposite the first direction, into a second write head terminal of the write driver; and detecting a short-circuit condition at at least one of the first and second write head terminals when an average value of the first current is different from an average value of the second current by a predetermined amount.

23. A method for detecting an open-circuit condition at at least one of a pair of write head terminals of a write driver, the write driver producing a write current that, when passed in at least one of two directions through an inductive head assembly coupled to the pair of write head terminals, polarizes the inductive head according to the at least one direction of the write current, the method comprising the steps of:

generating a mirrored write current that is proportional to the write current that is passed through the inductive head assembly in the two directions; and detecting an open-circuit condition at at least one of the first and second write head terminals when the magnitude of the write current drops below a predetermined value.

* * * * *